Patented June 13, 1939

2,161,991

UNITED STATES PATENT OFFICE 2,161,991

PROCESS FOR THE PRODUCTION OF OLEFINS

Hans Baehr, Ludwigshafen-on-the-Rhine, Germany, assignor to I. G. Farbenindustrie Aktiengesellschaft, Frankfort-on-the-Main, Germany No Drawing. Application February 23, 1933, Serial No. 658,135. In Germany February 24, 1932

2 Claims. (Cl. 260—683)

The present invention relates to the production of olefins by dehydrogenation of saturated hydrocarbons.

It has already been proposed to convert gaseous or vaporous (hereinafter referred to as "vaporized") saturated hydrocarbons, in particular those of the paraffin series, such as ethane or propane or the like, into olefins by dehydrogenation effected by heat-treatment at a temperature of about 700° C. This conversion may be promoted by the addition of oxygen or gases containing the same or by the presence of catalysts such as silica gel or metal oxides. If lower temperatures are employed the yields of olefins obtained are not very satisfactory, a great part of the initial hydrocarbons remaining unchanged. At higher temperatures greater yields in olefins are secured, however, in this case also side reactions take place by which a considerable part of the initial hydrocarbons or the olefins formed is consumed.

I have now found that the conversion of vaporized saturated hydrocarbons containing more than one carbon atom in the molecule into olefins is effected with great advantage at temperatures between 400° and 700° C. in the presence of free elementary sulphur or substances containing sulphur in the free elementary form or substances supplying free elementary sulphur under the conditions of working, all these substances hereinafter being referred to as those comprising free elementary sulphur. The sulphur in this treatment combines with two hydrogen atoms of the particular saturated hydrocarbons employed with the formation of the olefins having the same number of carbon atoms as the said saturated hydrocarbons and of hydrogen sulphide. In the case of the conversion of butane into butylene the course of the reaction may be illustrated by the following equation:

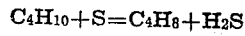

The sulphur is preferably used in an amount about equal to that required for a complete conversion of the saturated hydrocarbons. Suitable starting materials are saturated hydrocarbons having from 3 to 6 carbon atoms in the molecule. It is of advantage to operate at temperatures ranging between 450° and 650° C. Relatively low temperatures may be maintained if solid substances are employed which considerably increase the surface presented to the reacting gases or vapors, as for example pumice, silica gel, silicon or coke, which substances, if desired, may be activated by other materials promoting the dehydrogenation, such as antimony, tellurium or bismuth. Temperatures at which sulphur reacts with hydrocarbons with the formation of carbon disulphide should of course be avoided. An addition of a small amount of oxygen or air to the hydrocarbons to be converted favors the formation of unsaturated hydrocarbons.

As substances containing or supplying sulphur which may be used in the present process may be mentioned pyrite or the waste materials employed for purifying gases containing sulphur, such as waste bog iron ore. These substances are preferably heated with the hydrocarbons to be converted to such a temperature that the sulphur is freed therefrom or that volatile sulphur compounds are formed, the resulting mixture of hydrocarbons and sulphur or sulphur compounds then being heated to the reaction temperature proper. When employing hydrogen sulphide or other gaseous or vaporous divalent sulphur compounds which do not split off free sulphur by the mere action of heating as substances supplying sulphur, oxygen (which term for the purpose of the present invention also includes gases containing or supplying oxygen, such as air or sulphur dioxide) is added to the mixture of hydrocarbons and sulphur compounds. In this case the course of the conversion of butane may be illustrated by the following equations:

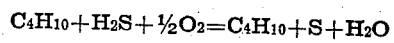

By the conversion of hydrocarbons with sulphur hydrogen sulphide is formed in addition to the olefins. This hydrogen sulphide may be made use of again for the conversion according to the present invention by adding it to fresh amounts of hydrocarbons to be converted together with a suitable amount of oxygen whereby the hydrogen sulphide is converted into sulphur which latter then acts upon the said hydrocarbons. In this manner it is possible to convert large amounts of hydrocarbons with a small amount of sulphur.

In the presence of oxygen the conversion takes place at a somewhat lower temperature than in the absence of this gas. Furthermore the combustion of the divalent sulphur compounds to form sulphur furnishes heat which is consumed by the dehydrogenation of the hydrocarbons. This latter advantage is also involved if oxygen is added in the case of the direct interaction of hydrocarbons and sulphur or volatile sulphur compounds.

For example when passing a mixture of butane and sulphur over pumice at 625° C. and then absorbing the resulting hydrogen sulphide a condensate amounting to from 70 to 75 per cent of the initial gas is obtained by cooling the gas to 60° below zero C. The said condensate contains 60 per cent of butylene and 40 per cent of butane which corresponds to a yield of 43.5 per cent of butylene with reference to the initial butane. If the residual butane after separation of the butylene is subjected once more to the same treatment a total yield of 60.9 per cent of butylene is obtained.

The hydrogen sulphide formed from the sulphur may be removed from the reaction gases by absorption, for example with organic bases or with potash solution, and then, after expelling it therefrom, it may be added to further charges of saturated hydrocarbons to be converted. The hydrogen sulphide may also be worked up to sulphur in the Claus furnace, the resulting sulphur being employed again for the conversion according to the present invention.

The following examples will further illustrate the nature of the invention, but the invention is not restricted to the particular operations described in these examples.

Example 1

60 liters of butane are passed per hour at about 340° C. through molten sulphur, a mixture of 1 molecular proportion of butane and 1.2 atomic proportions of vaporized sulphur thus being obtained. This mixture is passed at 625° C. over 0.1 liter of pumice, whereupon the treated gas is cooled to 120° C. in order to condense the sulphur not converted into hydrogen sulphide. (This sulphur may be used for reacting with further amounts of saturated hydrocarbons.) The gas is then cooled to ordinary temperature and washed with a solution of triethanolamine in order to remove the hydrogen sulphide. The purified gas is thereupon compressed to 10 atmospheres and cooled to about 0° C., whereby a mixture consisting of about 40 per cent of butane and 60 per cent of butylene is condensed together with small amounts of low boiling liquid hydrocarbons. The butylene is separated from the condensate by washing with a 60 per cent sulphuric acid and then recovered from the sulphuric acid solution, while the butane is returned to the heat-treatment as described above.

The uncondensed gas amounts to about 2.75 liters per 10 liters of initial gas; it contains besides methane about from 20 to 25 per cent of unsaturated hydrocarbons, especially ethylene and propylene, which may be recovered by cooling or converted together with the methane into hydrogen by interaction with steam.

The hydrogen sulphide expelled from the solution of triethanolamine is burnt in a Claus furnace with the formation of sulphur, which may be used for the conversion of further amounts of butane.

Example 2

60 liters of a mixture of butane and propane are passed per hour at about 550° C. over pyrite. The resulting mixture of hydrocarbons and vaporous sulphur (one molecular proportion of hydrocarbon to each atomic proportion of sulphur) is passed at about 600° C. over 0.1 liter of a mass free from iron prepared by impregnating 500 parts of coke with a solution of 15 parts of tartar emetic and drying.

The resulting gas is further treated similarly as described in Example 1. The gas freed from hydrogen sulphide is cooled down to 55° below zero C. instead of 0° C., whereby propane, butane and the corresponding unsaturated hydrocarbons are condensed from the gas. The condensed gas amounts to 92 per cent of the initial gas; it contains 67 per cent of olefins.

Example 3

A mixture of 60 liters of butane, 20 liters of hydrogen sulphide and 150 liters of air is passed at about 400° C. over 0.1 liter of silica gel. The resulting gas is purified from hydrogen sulphide as described in Example 1. By cooling to low temperatures 65 per cent of the initial gas is recovered unconverted. The condensed gas consists of 72 per cent of olefins. The uncondensed gas contains 28 per cent of olefins.

What I claim is:

1. A process for the production of olefins which comprises reacting at a temperature between 400° and 700° C. a paraffinic hydrocarbon containing from 3 to 6 carbon atoms in the molecule with sulphur intermediarily formed by the interaction at the said temperature of oxygen on a sulphur compound capable of reacting with oxygen with the formation of sulphur, and in an amount to cause a substantial conversion of said hydrocarbon into hydrogen sulphide and an olefin having the same number of carbon atoms as the said paraffinic hydrocarbon.

2. A process as claimed in claim 1 in which the divalent sulphur compound is hydrogen sulphide.

HANS BAEHR.